United States Patent Office 3,333,715
Patented Aug. 1, 1967

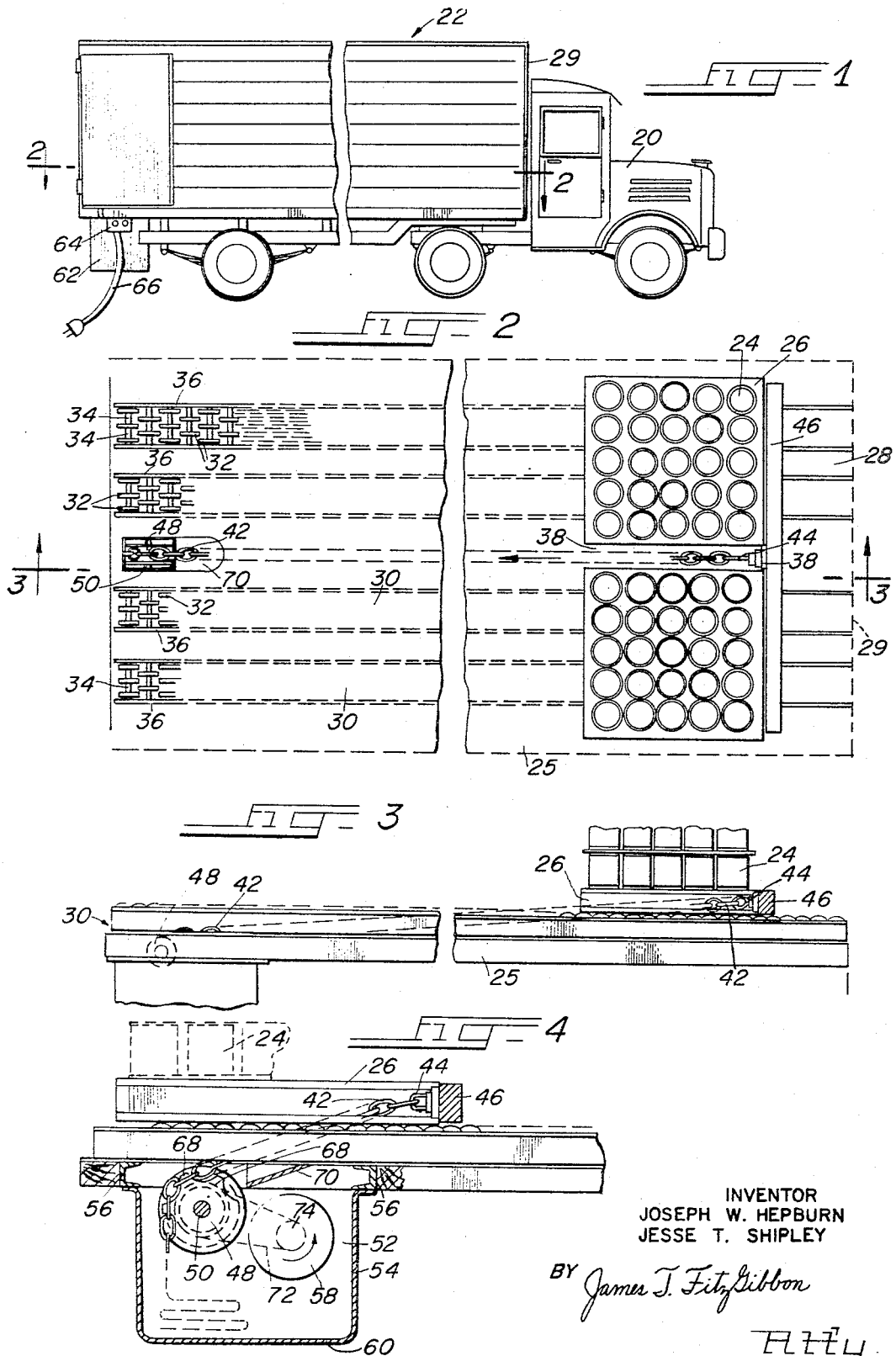

3,333,715
SELF-UNLOADING TRAILER UNIT
Joseph W. Hepburn, Chicago, and Jesse T. Shipley, Westchester, Ill., assignors to National Can Corporation, Chicago, Ill., a corporation of Delaware
Filed Mar. 26, 1965, Ser. No. 442,925
4 Claims. (Cl. 214—83.14)

The present invention relates generally to a self-unloading road trailer or semi-trailer which is normally towed by a tractor, and particularly to a self-unloading trailer which includes a novel mechanism for rapidly removing a payload such as pallets of tin cans, from such trailer or semi-trailer which is driven to a point adjacent to the intended discharge point.

Self-unloading trailers are known, and, particularly in the can industry, where a load with a relatively light weight but large volume is sought to be unloaded, such trailers are very advantageous. Likewise, loading docks are known which include winches, cables and like elements to facilitate removal of the load from a loaded trailer, but such loading dock installations obviously lack the flexibility which can be obtained where the unloading unit is integrally contained in the semi-trailer.

In general, prior known self-unloading trailers have been of two general types, one in which two continuous endless chains are disposed adjacent the floor of the trailer and form a closed loop lying generally parallel to the plane of the floor, and a second type in which the chain is in the form of a single closed loop oriented generally perpendicular to the floor, and in which the chain element moves continuously and is engageable or disengageable with the pallets when means are provided for raising chain or portions thereof into a work-engaging position.

The present invention provides a novel mechanism which is designed to unload tin cans or the like which are stacked on pallets, which in turn are loaded and unloaded by sliding them along conveyor type roller elements placed on the floor. The present invention provides a rapid, simple, economical and effective means of unloading a trailer which is loaded with a plurality of pallets containing cans or a like load, and at the same time, provides a trailer unit which can be used without the self-unloading feature without sacrificing capacity or making structural changes in the trailer unit.

In the construction of the present invention, conveyor elements or roller units may be removably placed on the floor of the trailer, and, by reason of the novel construction of the unloading unit of the present invention, the roller elements may be removed and the trailer operated in the normal manner. In prior known trailers, the construction was such that the roller elements and/or unloading mechanism were necessarily an integral part of the trailer body, and could not be removed to a position of non-use without great difficulty.

Another facet of the present invention relates to the novel means for connecting the transverse bar or unloader bar to the means for applying a force thereto. Thus, in the present invention, an unloader bar in use laterally spans the trailer and contains an integral coupling means which affords removable coupling if desired. The power means advantageously comprises an electric motor with a clutch and appropriate gears, adapted to rotate a shaft which includes, fixedly attached thereto, a sheave or pulley adapted to grasp a chain, such sheave being disposed beneath the floor of the trailer unit.

The present invention further includes a flexible but non-extensible connection in the form of a length of chain which is removably attachable to both the chain sheave and to the unloader bar, and which affords movement-imparting means for advancing the unloader bar towards the doors of the trailer and for sliding the pallets along the rollers.

The present invention thus provides for a removable chain which is readily adjustable as to initial setting, and which affords maximum simplicity in resetting the device for the unloading operation.

The present invention also provides means for compactly containing the chain which pulls the unloader bar to the rear, without winding the chain up and thereby making it difficult to unwind.

The present invention also provides electrical connecting means in the form of a cord for ready connection between the electric motor and an appropriate source of electric current, as well as appropriate control switches and safety devices associated therewith.

Accordingly, the objects of the present invention are to provide a trailer having the above enumerated advantages and characteristics, and other advantages, which will be referred to in greater detail herein, including those which are inherent in the invention.

These and other objects and advantages will become more apparent when considered in conjunction with a description of the preferred embodiments of the invention set out in the following specification and claims, and shown in the drawings, in which like numerals indicate corresponding parts throughout, and in which:

FIG. 1 is a side elevational view, with portions broken away, showing a tractor and semi-trailer unit incorporating the present invention;

FIG. 2 is a horizontal sectional view along lines 2—2 of FIG. 1 of the trailer of the present invention, showing a portion of the mechanism thereof;

FIG. 3 is a vertical sectional view, taken on lines 3—3 of FIG. 2 of the floor portion of the semi-trailer incorporating the present invention;

FIG. 4 is an enlarged vertical sectional view with portions broken away of the chain sheave operating mechanism of the present invention.

Referring now to the drawings in greater detail, there is shown generally in FIG. 1 a truck or tractor 20 which is adapted to removably receive a trailer unit 22 which incorporates the unloading mechanism of the present invention.

In general, the unloading mechanism is designed to repeatedly unload a plurality of cans 24 or other load resting on pallets 26, by moving the pallets 26 from the front portion 28 of the trailer 22 to the rear of the trailer on a plurality of conveyor units 30.

These pallets are relatively freely slidable back and forth along the rollers 32, which in turn ride under shafts 34 anchored in the side ramp 36 to conveyor units 30. These units 30 are generally of substantially the same length as the interior of the trailer, and are removably but fixedly mounted on the floor 25 of the trailer 22. The width of the front wall 29 of the trailer relative to the width of the pallets 26 is such that a slight space 38 exists between the interior edges 40 of each pallet 26. The space 38 is at least of sufficient width to accommodate and operate a chain 42 which is fixedly but removably attached as by turnbuckle 44 to an unloader bar 46. The chain is disposed in use over a chain sheave 48 which is rotatably mounted on a shaft 50. The construction and operation of the chain sheave 48 forms an important part of the present invention and its construction will be described in greater detail herein.

Another principal component of the present invention is the mechanism housing and supporting assembly 52, and this assembly comprises an outer shell 54 fixedly attached to a subframe 56 or like element of the trailer bed 26, and this shell also includes means to support the shaft 50 and the motor 58.

The floor 60 of the shell 54 accommodates the chain 42 after the chain has passed over the sheave 48. In addition, one end wall 62 (FIG. 1) accommodates a control unit 64 which is adapted to turn on power means, in the form of an electric motor 58 (FIG. 4) or other means for rotating the shaft 50. If an electric motor is used, the control box 64 may be used to turn current off and on, when such current is supplied to the motor through the connector cord 66.

Other conventional mechanism of the drive element are known, but do not form an essential part of the present invention, such elements being the electric motor referred to above, step down gear reduction means or the like, and a safety feature in the form of a clutch mechanism or the like.

A number of advantages of the present invention result from the use of a chain 42, especially in combination with the sheave 48, inasmuch as the positive engagement gripping surfaces 68 of the sheave 48 are adapted to place the chain 42 in tension and advance it longitudinally with uniform speed along the trailer bed through the floor mounted chain guide 70 but still allow the chain to disengage itself from the sheave 48 and fall freely downwardly, as shown in FIG. 4, to the bottom 60 of the shell 54.

In this manner, there is no need that the entire mechanism be disengaged and rotated backwardly when it is desired to reset the chain mechanism, as the chain 42 may merely be lifted upwardly from the gripping surfaces 68 and carried to the front of the trailer, where it may be easily attached to the unloader bar 46 by the turnbuckle 44. In addition, the rate of movement of the chain 42 and unloader bar 46 toward the rear, in the use of the unit, remains uniform for a constant motor speed, inasmuch as there is no spiral windup of the chain on the sheave 48. The chain and sheave provision of the present invention affords the simplest and most economical combination of means for providing a sure grip on the unloader bar advancing means, together with the simplest and most effective means of disengaging the chain for a resetting operation. The location of the sheave 48 is desirably such that its upper surfaces are located slightly below the floor 26 of the trailer so that the trailer may be used as a conventional trailer in the event the self-unloading feature is not desired to be used. In contrast, other unloading mechanisms fixed in trailer units are characterized by having their operating mechanisms above floor level.

Sheave 48 is driven by a belt 72 engaged with a drive pulley 74. Other equivalent drive means, such as a gear case and roller chain may be utilized to drive the sheave.

In the use of the present invention, the chain 42 is lifted from the sheave 48 and removed from the shell 54. Thereupon, the chain 42 is attached by the turnbuckle 44 to the unloader bar 46 and the bar is moved to the front of the trailer and placed on top of the front row of rollers 32 forming a portion of the conveyor 30. Thereupon, the truck is loaded by placing loaded pallets on the conveyors 30 and moving the pallets to the front of the trailer, and thereupon further adding loaded pallets until the trailer is completely loaded. Thereupon, the pallets are blocked in place and the rear end of the chain is engaged in place with the gripping surfaces 68 of the sheave 48 and allowed to remain there during shipment.

After the loaded trailer has reached its intended destination, the operator may plug the cord 66 into the power source, and actuate the switch 64, whereupon the motor will cause the sheave 48 to rotate and the pallets to be drawn backwardly on the conveyors 30 until the trailer is unloaded. Thereupon, the trailer is immediately ready, without further preparation, to start the cycle again.

The provision of the front mounted chain guide 70 minimizes wear on the trailer floor and enable the sheave to be located, and the chain to be engaged below floor level.

As noted above, the entire assemblies conveyor 30 may be removed from the floor of the trailer, and by reason of the disposition of the other elements below the floor, the trailer is thereupon suited for other uses without diminution of its full capacity.

The present invention has been illustrated in the environment of a semi-trailer, but it will be readily understood that the invention is also suitable for use with straight trucks or the like.

It will thus be seen that the present invention provides a novel self-unloading trailer unit having novel advantages and characteristics, including those hereinbefore pointed out and others which are inherent in the invention.

It is also understood that certain modifications of the self-unloading trailer unit of the present invention may be made without departing from the spirit of the invention or the scope of the appended claims.

We claim:
1. A self-unloading vehicle trailer comprising, in combination,
  (a) a trailer body including a substantially flat floor portion therein,
  (b) roller conveyor means disposed on the floor of said trailer, and adapted to allow longitudinal passage of a load thereover,
  (c) motor means disposed beneath said floor at the rear end of said trailer body,
  (d) rotary shaft means disposed beneath said floor at the rear end of said trailer body and operatively connected to said motor means,
  (e) wheel means disposed beneath said floor at the rear end of said trailer body and fixedly attached to said rotary shaft for positively engaging flexible but substantially nonextensible means for connecting a load to said wheel means,
  (f) an unloading bar of a transverse extent substantially equal to the width of the trailer body, said bar being adapted to engage a plurality of pallets disposed thereabove, said bar being located in use adjacent said floor and movable longitudinally of said trailer, and,
  (g) flexible but substantially non-extensible connecting means for connecting said transverse bar to said wheel means, said elements being constructed and arranged so that rotation of said shaft will cause longitudinal movement of said unloading bar when said connecting means is connected between said wheel means and said unloading bar and in which said flat floor portion is substantially free, except for said conveyor means, from additional elements thereon which would create an obstruction to traffic passing thereover.

2. A self-unloading vehicle trailer unit as defined in claim 1 in which said roller conveyor means comprises a plurality of roller conveyor elements spaced apart from each other and removably disposed on the floor portion of said trailer body.

3. A self-unloading vehicle trailer unit as defined in claim 1 in which said connecting means comprises a chain and in which said wheel means comprises a chain sheave including a plurality of gripping surfaces contoured to receive said chain on complementary mating surfaces thereon, said mating surfaces located on a radially outer, axially centrally disposed portion of said sheave.

4. A self-unloading vehicle trailer unit as defined in claim 1 in which said motor means comprises an electric motor and in which said trailer further includes means for connecting said electric motor to a relatively remote current source.

References Cited
UNITED STATES PATENTS

| | | | |
|---|---|---|---|
| 2,334,124 | 11/1943 | Peterson | 214—84 |
| 2,463,643 | 3/1949 | Recker | 214—83.14 X |
| 3,250,408 | 5/1966 | Daniluk et al. | 214—83.22 X |

GERALD M. FORLENZA, *Primary Examiner.*

ALBERT J. MAKAY, *Examiner.*